US 6,743,860 B2

(12) United States Patent
Mizuno

(10) Patent No.: US 6,743,860 B2
(45) Date of Patent: Jun. 1, 2004

(54) THERMOPLASTIC RESIN COMPOSITION AND PRODUCTION PROCESSES THEREOF

(75) Inventor: Hiroki Mizuno, Tokyo (JP)

(73) Assignee: Riken Technos Corporation, Tokyo (JP)

( * ) Notice: Subject to any disclaimer, the term of this patent is extended or adjusted under 35 U.S.C. 154(b) by 81 days.

(21) Appl. No.: 10/203,132

(22) PCT Filed: Feb. 5, 2001

(86) PCT No.: PCT/JP01/00801

§ 371 (c)(1),
(2), (4) Date: Aug. 2, 2002

(87) PCT Pub. No.: WO01/57103

PCT Pub. Date: Aug. 9, 2001

(65) Prior Publication Data

US 2003/0055166 A1 Mar. 20, 2003

(30) Foreign Application Priority Data

Feb. 4, 2000 (JP) .......................................... 2000-028214

(51) Int. Cl.$^7$ ........................... C08L 53/02; C08L 23/02
(52) U.S. Cl. ........................ 525/88; 525/92 F; 525/93; 525/94; 525/95; 525/96; 525/97; 525/98; 525/99; 525/263
(58) Field of Search ..................... 525/88, 92 F, 93–99, 525/263

(56) References Cited

U.S. PATENT DOCUMENTS 6,130,696 A * 10/2000 Mashita et al. ............... 347/86

6,433,062 B1 * 8/2002 Tasaka et al. ............... 524/484

FOREIGN PATENT DOCUMENTS

| EP | 0 845 498 A1 | 6/1998 |
| JP | 59-006236 | 1/1984 |
| JP | 10-287775 | 10/1998 |
| JP | 11-293042 | 10/1999 |

* cited by examiner

Primary Examiner—Jeffrey Mullis
(74) Attorney, Agent, or Firm—Pitney, Hardin, Kipp & Szuch LLP

(57) ABSTRACT

The present invention relates to a thermoplastic resin composition comprising (a) 100 parts by weight of a block copolymer comprising at least two polymeric blocks A composed mainly of a vinyl aromatic compound and at least one polymeric block B composed mainly of a conjugated diene compound, or a hydrogenated block copolymer thereof, (d) 5 to 50 parts by weight of an organic peroxide, and (e) 10 to 80 parts by weight of one or more substances selected from the group consisting of multifunctional vinyl compounds and multifunctional (meth)acrylate compounds. The present invention provides a master batch of an organic peroxide in which the organic peroxide is so uniformly dispersed in a thermoplastic resin that crosslinking and/or decomposition occur uniformly, a method of preparing the same, a thermoplastic resin composition obtained using the master batch and a method of preparing the same.

13 Claims, 2 Drawing Sheets

THERMOPLASTIC RESIN COMPOSITION AND PRODUCTION PROCESSES THEREOF

FIELD OF TECHNOLOGY

The present invention relates to a master batch of an organic peroxide, a thermoplastic resin composition obtained by using the master batch, and methods of manufacturing the master batch and the composition.

PRIOR ART

A conventional master batch containing a crosslinking agent causes a problem of forming lumps in molding procedures. Here, "lumps" are gels caused by local excess crosslinking due to an unevenly dispersed crosslinking agent or crosslinking aid, and polymerized crosslinking aid itself. In injection molding, even if lumps are formed, they appear rarely on the surfaces of molded articles, so that the articles can be placed on the market. However, in extrusion molding, the lumps appear on the surfaces of molded articles to damage appearance of the articles.

It is known that a crosslinking agent and a crosslinking aid are added simultaneously and kneaded in producing a resin composition. Since it is difficult to uniformly disperse the crosslinking agent and the crosslinking aid in the composition, there occur such problems as formation of gels and bad dispersion.

Generally, the crosslinking agent and the crosslinking aid are used in such a manner that they are absorbed in a resin or an inorganic substance. In that case, an absorption process is required, which makes the process more complex and costly. Particularly where they are absorbed in an inorganic substance, a problem arises that a specific gravity of a resin composition ultimately obtained is greater than where they are absorbed in a resin.

In addition, there is a problem in storing a resin composition comprising a crosslinking agent because an organic peroxide as the crosslinking agent decomposes. Thus, a manner of storing the composition is restricted.

DISCLOSURE OF THE INVENTION

The present invention provides a master batch of an organic peroxide in which the organic peroxide is so uniformly dispersed in a thermoplastic resin that crosslinking and/or decomposition occur uniformly, a method of preparing the same, a thermoplastic resin composition obtained using the master batch and a method of preparing the same.

Thus, the present invention is (1) a thermoplastic resin composition comprising
  (a) 100 parts by weight of a block copolymer comprising at least two polymeric blocks A composed mainly of a vinyl aromatic compound and at least one polymeric block B composed mainly of a conjugated diene compound, or a hydrogenated block copolymer thereof,
  (d) 5 to 50 parts by weight of an organic peroxide, and
  (e) 10 to 80 parts by weight of one or more substances selected from the group consisting of multifunctional vinyl compounds and multifunctional (meth)acrylate compounds.

Further, the present invention is
(2) the thermoplastic resin composition according to (1) above, wherein the composition further comprises
  (b) 15 to 45 parts by weight of a liquid polybutadiene, or
  (c) 15 to 45 parts by weight of a branched saturated hydrocarbon having 4 to 155 carbon atoms, or both (b) and (c), and
  (f) 0 to 5 parts by weight of a lubricant.

In the above resin compositions, i.e., master batches of organic peroxide, component (d) is uniformly dispersed because of the presence of component (e), preferably both component (e) and component (c). When melt-kneading the master batch with the thermoplastic resin composition which comprises component (j), or components (a), (g), (h) and (i) as will be described below crosslinking and/or decomposition reaction occurs uniformly in the thermoplastic resin.

Uniform dispersion of component (d) in the master batch can be attained by kneading at a temperature of 100° C. or lower, so that a crosslinking reaction is prohibited in kneading procedure.

In melt-kneading procedure for the thermoplastic resin composition using the master batch, component (c) slows down crosslinking and/or decomposition reaction to allow component (d) to be dispersed uniformly and to cause crosslinking or decomposition reaction uniformly in a controlled speed. For this reason, it is believed that the lumps are not formed in a molded article. The amount of component (c) may depend on its ability to slow down the reaction.

Because an organic peroxide is not made absorbed in a resin or inorganic substance, the present master batch is easy to handle and can be stored in stable state.

Another aspect of the present invention is (3) a method of preparing a thermoplastic resin composition comprising a first step for preparing thermoplastic resin composition (I) by kneading
  (a) 100 parts by weight of a block copolymer comprising at least two polymeric blocks A composed mainly of a vinyl aromatic compound and at least one polymeric block B composed mainly of a conjugated diene compound, or a hydrogenated block copolymer thereof,
  (b) 15 to 45 parts by weight of a liquid polybutadiene,
  (c) 15 to 45 parts by weight of a branched saturated hydrocarbon having 4 to 155 carbon atoms,
  (d) 5 to 50 parts by weight of an organic peroxide, and
  (e) 10 to 80 parts by weight of one or more substances selected from the group consisting of multifunctional vinyl compounds and multifunctional (meth)acrylate compounds, and
  (f) 0 to 5 parts by weight of a lubricant at a temperature of 100° C. or lower, and a second step of melt-kneading 3 to 50 parts by weight of said thermoplastic resin composition (I) with
  (j) 100 parts by weight of one or more thermoplastic resins selected from the group consisting of styrene-butadiene-styrene copolymers, styrene-isoprene-styrene copolymers, styrene-(ethylene/butene)-styrene copolymers, styrene-(ethylene/propylene)-styrene copolymers, styrene-(ethylene/ethylene/propylene)-styrene copolymers, styrene-butadiene rubbers, butadiene rubbers, polybutadienes, isoprene rubbers, acrylonitrile-butadiene rubbers, chloroprene rubbers, ethylene-propylene rubbers, ethylene-propylene-diene terpolymers, butyl rubbers, acrylic rubbers, polyolefin resins, thermoplastic polyester elastomers, thermoplastic polyurethane elastomers and thermoplastic amide elastomers.

Also the present invention is a method of preparing a thermoplastic resin composition comprising a first step for preparing thermoplastic resin composition (I) by kneading
  (a) 100 parts by weight of a block copolymer comprising at least two polymeric blocks A composed mainly of a vinyl aromatic compound and at least one polymeric block B composed mainly of a conjugated diene compound, or a hydrogenated block copolymer thereof, (b) 15 to 45 parts by weight of a liquid polybutadiene, (c) 15 to 45 parts by weight of a branched saturated hydrocarbon having 4 to 155 carbon atoms, (d) 5 to 50 parts by weight of an organic peroxide, and (e) 10 to 80 parts by weight of one or more substances selected from the group consisting of multifunctional vinyl compounds and multifunctional (meth)acrylate compounds, and (f) 0 to 5 parts by weight of a lubricant at a temperature of 100° C. or lower, and a second step of melt-kneading 3 to 50 parts by weight of said thermoplastic resin composition (I) with (a) 100 parts by weight of a block copolymer comprising at least two polymeric blocks A composed mainly of a vinyl aromatic compound and at least one polymeric block B composed mainly of a conjugated diene compound, or a hydrogenated block copolymer thereof, (g) 10 to 1,000 parts by weight of a non-aromatic softening agent for rubbers, (h) 0 to 150 parts by weight of a peroxide-decomposing olefinic resin, or a peroxide-decomposing olefinic copolymer rubber, and (i) 0 to 150 parts by weight of a peroxide-crosslinking olefinic resin, or a peroxide-crosslinking olefinic copolymer rubber.

The preferred embodiments of the invention are as follows:

(5) a thermoplastic resin composition comprising 3 to 50 parts by weight of the thermoplastic resin composition according to (1) or (2) above, and (j) 100 parts by weight of one or more thermoplastic resins selected from the group consisting of styrene-butadiene-styrene copolymers, styrene-isoprene-styrene copolymers, styrene-(ethylene/butene)-styrene copolymers, styrene-(ethylene/propylene)-styrene copolymers, styrene-(ethylene/ethylene/propylene)-styrene copolymers, styrene-butadiene rubbers, butadiene rubbers, polybutadienes, isoprene rubbers, acrylonitrile-butadiene rubbers, chloroprene rubbers, ethylene-propylene rubbers, ethylene-propylene-diene terpolymers, butyl rubbers, acrylic rubbers, polyolefin resins, thermoplastic polyester elastomers, thermoplastic polyurethane elastomers and thermoplastic amide elastomers, and (6) a thermoplastic resin composition comprising 3 to 50 parts by weight of the thermoplastic resin composition according to according to (1) or (2) above, and (a) 100 parts by weight of a block copolymer comprising at least two polymeric blocks A composed mainly of a vinyl aromatic compound and at least one polymeric block B composed mainly of a conjugated diene compound, or a hydrogenated block copolymer thereof, (g) 10 to 1,000 parts by weight of a non-aromatic softening agent for rubbers, (h) 0 to 150 parts by weight of a peroxide-decomposing olefin resin, or a peroxide-decomposing olefinic copolymer rubber, and (i) 0 to 150 parts by weight of a peroxide-crosslinking olefin resin, or a peroxide-crosslinking olefinic copolymer rubber.

PREFERRED EMBODIMENTS OF THE INVENTION

Figure 1:
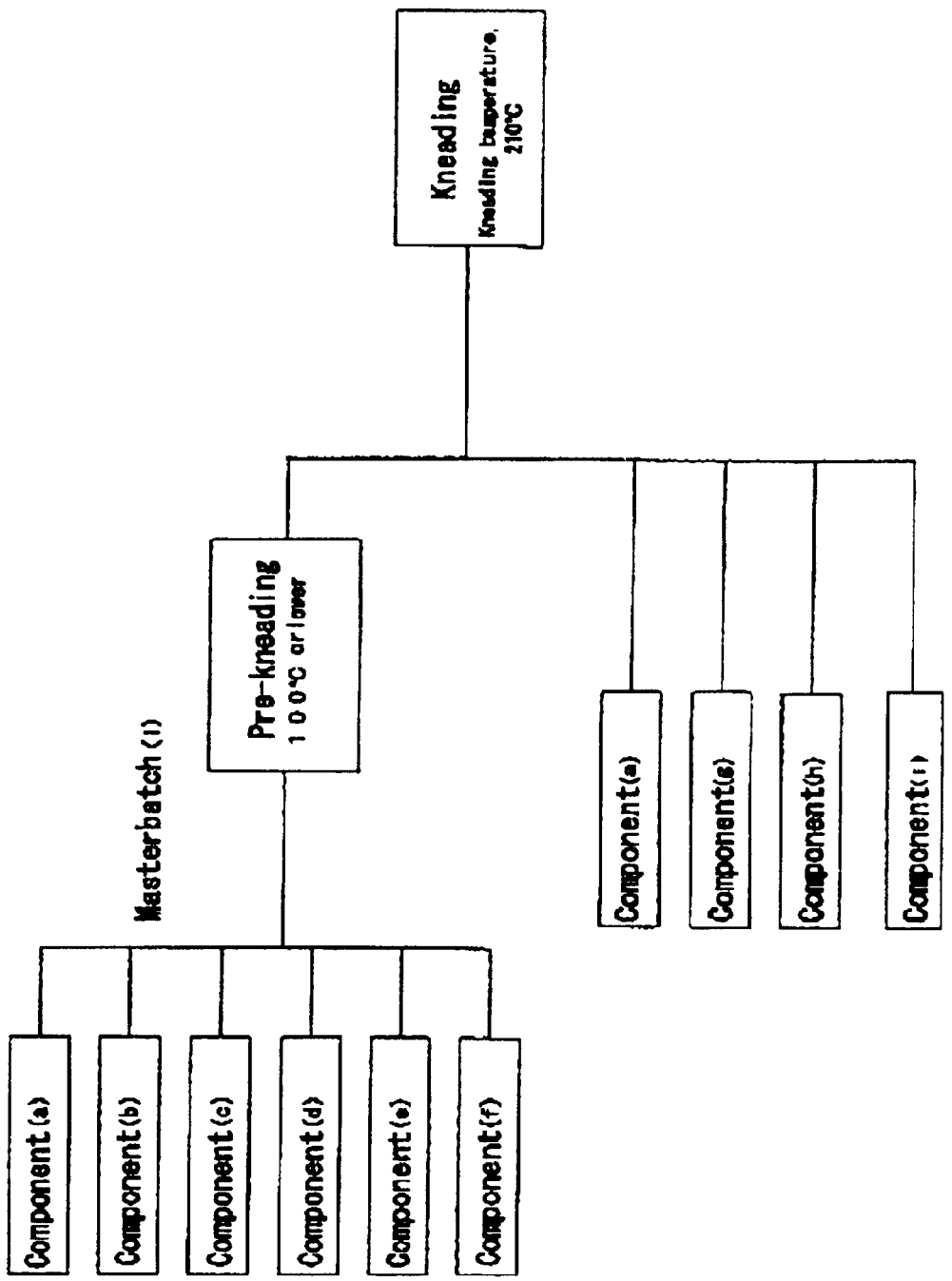
FIG. 1 is a flowchart of a first preparation method used in the Examples and the Comparative Examples.

Components used in the present invention will be explained below.

Component (a): Block Copolymer

Component (a) used in the invention is a block copolymer comprising at least two polymeric blocks A composed mainly of a vinyl aromatic compound and at least one polymeric block B composed mainly of a conjugated diene compound, or a hydrogenated block copolymer thereof, or a mixture thereof, such as vinyl aromatic compound-conjugated diene compound block copolymers having a structure of, for example, A-B-A, B-A-B-A, A-B-A-B-A, or hydrogenated copolymers thereof.

The above-mentioned (hydrogenated) block copolymer (hereinafter the terms, "(hydrogenated) block copolymer", mean a block copolymer and a hydrogenated block copolymer) contains 5 to 60 wt. %, preferably 20 to 50 wt. %, of the vinyl aromatic compound.

Preferably, the polymer block A composed mainly of a vinyl aromatic compound consists of a vinyl aromatic compound alone, or comprises 50 wt. % or greater, preferably 70 wt. % or greater, of a vinyl aromatic compound and a conjugated diene compound, or a hydrogenated copolymeric block thereof.

The polymeric block B composed mainly of a conjugated diene compound consists of a conjugated diene compound alone, or comprises 50 wt. % or greater, preferably 70 wt. % or greater, of the conjugated diene compound and the vinyl aromatic compound, or hydrogenated copolymeric block thereof.

In each of polymeric block A composed mainly of a vinyl aromatic compound and polymeric block B composed mainly of a conjugated diene compound, the vinyl compound and the conjugated diene compound may be distributed in a molecular chain at random, in a tapered form (i.e., a monomer content increases or decreases along a molecular chain), partially in a block form or in a form of an arbitrary combination thereof.

Where two or more polymeric blocks A composed mainly of a vinyl aromatic compound or two or more polymeric blocks B composed mainly of a conjugated diene compound are present, they may be same with or different from each other in structure.

The vinyl aromatic compound constituting the (hydrogenated) block copolymer may be one or more selected from, for instance, styrene, alpha-methylstyrene, vinyl toluene, and p-tert-butylstyrene, among which styrene is most preferred. The conjugated diene compound may be one or more selected from, for instance, butadiene, isoprene, 1,3-pentadiene, and 2,3-dimethyl-1,3-butadiene, among which butadiene, isoprene, and a combination thereof are preferred.

Polymeric block B composed mainly of a conjugated diene compound can have any microstructure.

In the butadiene block, a ratio of 1,2-micro structure ranges preferably from 20 to 50%, more preferably from 25 to 45%.

In the isoprene block, it is preferred that 70 to 100 wt. % of the isoprene compound have 1,4-micro structure, and at least 90% of the aliphatic double bonds originated from the isoprene compound are hydrogenated.

The weight average molecular weight of the (hydrogenated) block copolymer with the aforesaid structure to be used in the invention ranges preferably from 5,000 to 1,500,000, more preferably from 10,000 to 550,000, and most preferably from 100,000 to 400,000. A ratio of the weight average molecular weight (Mw) to the number average molecular weight (Mn), Mw/Mn, is preferably 10 or less, more preferably 5 or less and most preferably 2 or less. Moleculare structure of the (hydrogenated) block copolymer may be linear, branched, radial or any combination thereof.

Numerous methods have been proposed to prepare these block copolymers. In a typical method, described in, for instance, in Japanese Patent Publication 40-23798/1965, block polymerization is carried out in an inert solvent using a lithium catalyst or a Ziegler catalyst. The hydrogenated block copolymer is obtained by hydrogenating the block copolymer obtained by the aforesaid method in the presence of a hydrogenation catalyst in an inert solvent.

Examples of the above-mentioned (hydrogenated) block copolymers include styrene-butadiene-styrene copolymers, styrene-isoprene-styrene copolymers, styrene-(isoprene/butadiene)-styrene copolymers, styrene-(ethylene/butene)-styrene copolymers, styrene-(ethylene/propylene)-styrene copolymers, and styrene-(ethylene/propylene))-styrene copolymers.

Styrene-(ethylene/propylene)-styrene copolymers are preferred and styrene-(ethylene/ethylene/propylene)-styrene copolymers are more preferred.

Component (b): Liquid Polybutadiene

Liquid polybutadienes is liquid, preferably transparent, at room temperature, in which microstructure of a main chain is of vinyl 1,2-bond, trans 1,4-bond, and cis 1,4-bond. The amount of the vinyl 1,2-bond is preferably 30 wt. % or less. If the amount of the vinyl 1,2-bond exceeds 30 wt. %, low-temperature properties of the composition obtained are unfavorably worse.

A number average molecular weight of the liquid polybutadiene is preferably at most 5,000, more preferably at most 4,000, and preferably at least 1,000, more preferably at least 2,000 If the number average molecular weight is less than the lower limit, resistance to heat deformation of the composition obtained is worse. If it exceeds the upper limit, compatibility in the composition obtained is worse.

The liquid polybutadiene is preferably a copolymerizable compound having one or more groups selected from epoxy, hydroxyl, isocianate and carboxyl groups. Among these, one having a hydroxyl group and a copolymerizable unsaturated double bond is particularly preferred such as commercially available R-45HT (trademark), ex Idemitsu Petrochemical Co., Ltd.

Component (b) is blended in an amount of at most 45 parts by weight, preferably at most 40 parts by weight, more preferably at most 38 parts by weight, and at least 15 parts by weight, preferably at least 18 parts by weight and more preferably at least 20 parts by weight, per 100 parts by weight of component (a). If the amount is less than the lower limit, the effect of Component (b), i.e., imparting softness to the composition, is not observed If the amount exceeds the upper limit, bleed-out of component (b), occurs. By adding component (b) one can prevent liquid components, such as the organic peroxide and component (e) from bleeding out of the pellets of the organic peroxide master batch.

Component (c): Branched Saturated Hydrocarbon

Component (c) is a branched saturated hydrocarbon having at least 4, preferably at least 8 carbon atoms, and at most 155, preferably at most 20, more preferably at most 12, carbon atoms. A single branched saturated hydrocarbon or a mixture thereof can be used, which may be in a form of (co)polymeric oligomer. Desirable (co)polymeric oligomers are one or more of co-oligomers selected from isopropyl-ethylene co-oligomers, isopropyl-propylene co-oligomers, isopropyl-butene co-oligomers, and isopropyl-octane co-oligomers each having a weight average molecular weight of 260 to 2,000. Isoparaffin compounds are particularly preferred as component (c).

Examples of the isoparaffin compounds include isobutane, 2-methylbutane, i.e., isopentane, neopentane, 2-methylpentane, i.e., isohexane, 3-methylbutane, i.e., isopentane, 2,2-dimethylbutane, i.e., neohexane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2,2,3-trimethylbutane, i.e., tributane, 3-methylheptane, 2,2-dimethylhexane, 2,3-dimethylhexane, 2,4-dimethylhexane, 2,5-dimethylhexane, 3,4-dimethylhexane, 2,2,3-trimethylpentane, 2,2,4-trimethylpentane, i.e., isooctane, 2,3,4-trimethylpentane, 2,3,3-trimethylpentane, 2,3,4-trimethylpentane, 2-methyloctane, i.e., isononane, 2-methylnonane, isodecane, isoundecane, isododecane, isotridecane, isotetradecane, isopentadecane, isooctadecane, isononadecane, isoeicosane, 4-ethyl-5-methyloctane, and derivatives thereof.

More preferred are isoparaffins which are liquid at room temperature, particularly, those having an ignition point of 200° or higher, such as IF-Solvent 2835, synthetic isoparaffin hydrocarbon with an isoparaffin content of 99.8 wt. % or greater, ex Idemitsu Petrochemical Co., Ltd.

Besides the above-mentioned branched saturated hydrocarbons, Component (c) may optionally contain one or more of the following compounds: normal paraffins such as methane, ethane, propane, butane, pentane, hexane, heptane, octane, nonane, decane, undecane, dodecane, tetradecane, pentadecane, hexadecane, heptadecane, octadecane, nonadecane, eicosane, heneicosane, docosane, tricosane, tetracosane, pentacosane, hexacosane, heptacosane, octacosane, nonacosane, triacontane, hentriacontane, dotriacontane, pentatriacontane, hexacontane, and heptacontane; unsaturated hydrocarbons, for example, ethylenic hydrocarbons such as ethylene, propylene, 1-butene, i.e., alpha-butylene, 2-butene, i.e., beta-butylene, isobutylene, i.e., gamma-butylene, 1-pentene, i.e., alpha-amylene, 2-pentene, i.e., beta-amylene, 3-methyl-1-butene, i.e., gamma-amylene, 3-methyl-1-butene, i.e., alpha-isoamylene, 2-methyl-2-butene, i.e., beta-isoamylene, 1-hexene, 2,3-dimethyl-2-butene, i.e., tetramethylethylene, 1-heptene, 1-octene, 1-nonene, 1-decene; acetylenic hydrocarbons such as acetylene, methylacetylene, 1-butyne, 2-butyne, 1-pentyne, 1-hexyne, 1-octyne, 1-nonyne, and 1-decene; and derivatives of these hydrocarbons.

For the safety in handling, branched saturated hydrocarbons having a flash point of 80° C. or higher and/or an ignition point of 200° C. or higher are desirable.

Component (c) is blended in an amount, per 100 parts by weight of component (a), of at most 45 parts by weight, preferably at most 40 parts by weight, more preferably at most 38 parts by weight, and at least 15 parts by weight, preferably at least 18 parts by weight, more preferably at least 20 parts by weight. If the amount is less than the lower limit, the effect of Component (c), i.e., reduction in the reaction rate, is not observed. If it exceeds the upper limit, bleed-out of component (c) occurs.

Component (d): Organic Peroxide

As the organic peroxide, the following may be named: dicumyl peroxide, di-tert-butyl peroxide, 2,5-dimethyl-2,5-di-(tert-butylperoxy)hexane, 2,5-dimethyl-2,5-di-(tert-butylperoxy)hexine-3,1,3-bis(tert-butylperoxyisopropyl)

benzene, 1,1,-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butylperoxybenzoate, tert-butylperoxyisopropylcarbonate, diacetyl peroxide, lauroyl peroxide, and tert-butylcumyl peroxide. Among these compounds, 2,5-dimethyl-2,5-di(tert-butylperoxy)hexane and 2,5-dimethyl-2,5-di(tert-butylperoxy)hexine-3 are most desirable in terms of odor, coloring property and stability against scorching.

Component (d) is blended in an amount, per 100 parts by weight of component (a), of at most 50 parts by weight, preferably at most 40 parts by weight, and at least 5 parts by weight, preferably at least 10 parts by weight. If the amount is less than the lower limit, compression set or oil resistance is not improved. If it exceeds the upper limit, a part of the organic peroxide is not dispersed in a composition. Then, a resultant molded article is worse in appearance, compression set and oil resistance, though molding operation may be done with difficulty.

Component (e): One or More Substances Selected from the Group Consisting of Multifunctional Vinyl Compounds and Multifunctional (Meth)Acrylate Compounds As the preferred multifunctional vinyl compounds, divinylbenzene and triallylcyanulate are named. As the preferred multifunctional (meth)acrylate compounds, the following compounds are named: dimethacrylates of polyethylene glycol having 1 to 23 ethylene glycol repeating units such as ethylene glycol dimethacrylate, diethylene glycol dimethacrylate, triethylene glycol dimethacrylate, tetraethylene glycol dimethacrylate, and polyethylene glycol dimethacrylate; and trimethylolpropane trimethacrylate, allylmethacrylate, 2-methyl-1,8-octanediol dimethacrylate, and 1,9-nonandiol dimethacrylate. Among these, dimethacrylates of polyethylene glycol having 3 or 4 ethylene glycol repeating units, 2-methyl-1,8-octanediol dimethacrylate, and 1,9-nonanediol dimethacrylate are easy to handle and effective because they serve as a dispersant. Those can be used individually or as a mixture of two or more. By using these compounds, uniform and efficient crosslinking reactions and/or decomposition reactions are expected.

Component (e) is blended in an amount, per 100 parts by weight of component (a), of at most 80 parts by weight, preferably at most 70 parts by weight, most preferably at most 60 parts by weight, and at least 10 parts by weight, preferably at least 20 parts by weight, more preferably at least 30 parts by weight. If the amount is less than the lower limits the effect of adding Component (e) is not observed. If it exceeds the upper limit, crosslinking and/or decomposition reactions in the composition proceed too fast to allow all of Component (e) to be dispersed. As a result, a composition prepared does not have good appearance, compression set or oil resistance.

Component (f): Lubricant

As the lubricant, the following substances may be named: paraffin and hydrocarbon resin lubricants such as paraffin waxes, liquid paraffin, and polyethylene waxes; fatty acid lubricants such as stearic acid, hydroxystearic acid, mixed lubricants containing stearic acid, hardened oils; fatty acid amide lubricants such as stearoamides, oxystearoamides, oleyl amides, erucyl amides, ricinoleic amides, behenic amides, methylol amides, higher fatty acid monoamides, methylenebis-stearoamides, methylenebis-stearobehenic amides, ethylenebis-stearoamides, higher fatty acid bisamide type lubricants, stearoamide lubricants, and mixed lubricants containing an amide compound; fatty acid ester lubricants such as methylhydroxystearate, polyhydric alcohol fatty acid esters, saturated fatty acid esters, ester waxes, and mixed lubricants containing an ester compound; fatty acid ketone lubricants; aliphatic alcohol lubricants, e.g., higher alcohols, mixed lubricants containing a higher alcohol, and higher alcohol esters; mixed lubricants containing a partial ester of fatty acid and polyhydric alcohol such as glycerin fatty acid esters, hydroxystearic acid triglycerides, and sorbitan fatty acid esters; distearyl-epoxy-hexahydrophthalate; and phthalic anhydride derivatives.

Among these, paraffinic lubricants and hydrocarbon resin lubricants such as paraffin waxes, liquid paraffin and polyethylene waxes are preferred.

Component (f) is blended in an amount, per 100 parts by weight of component (a), of at most 5 parts by weight, preferably at most 3 parts by weight. Even if the amount exceeds the upper limit, there will be no further change in the effect of lubrication on the resin composition obtained.

Component (j): Thermoplastic Resin

Examples of Component (j), thermoplastic resin, to be added to the thermoplastic resin composition according to the invention include the above-mentioned component (a), preferably styrene-butadiene-styrene copolymers, styrene-isoprene-styrene copolymers, styrene-(ethylene/butene)-styrene copolymers, styrene-(ethylene/propylene)-styrene copolymers, and styrene-(ethylene/ethylene/propylene)-styrene copolymers; styrene-butadiene rubbers, butadiene rubbers, isoprene rubbers, acrylonitrile-butadiene rubbers, chloroprene rubbers, ethylene-propylene rubbers, ethylene-propylene-diene terpolymers, butyl rubbers, acrylic rubbers, polyolefin resins such as polyethylenes and polypropylenes, thermoplastic polyester elastomers, thermoplastic polyurethane elastomers and thermoplastic amide elastomers. The thermoplastic resin can be used individually, or in combination of two or more of them.

Component (g): Non-Aromatic Softening Agent for Rubber

As the non-aromatic Softening agent for rubber, non-aromatic mineral oils and liquid or low molecular weight synthetic softening agents are named. Generally, the mineral oil softening agents for rubber are mixtures of aromatic cyclic compounds, naphthenic compounds and paraffinic compounds. Those in which 50% or more of the whole carbon atoms is in paraffinic chains are called a paraffinic type; those in which 30 to 40% of the whole carbon atoms is in naphthenic rings are called a naphthenic type; and those in which 30% or more of the whole carbon atoms is in aromatic rings are called an aromatic type.

Mineral oil softening agents for rubber to be used as component (g) according to the invention are of the aforesaid paraffinic or naphthenic type. Aromatic softening agents are improper, because they make component (a) soluble and hinder the crosslinking reaction so that physical properties of a composition obtained are not improved. Paraffinic ones are preferred as component (g). Among the paraffinic ones, those with a less content of aromatic cyclic components are particularly preferred.

The non-aromatic softening agents for rubber have a kinetic viscosity at 37.8° C. of 20 to 500 cSt, a pour point of −10 to −15° C. and a flash point (COC) of 170 to 300° C., Component (g) is blended in an amount, per 100 parts by weight of Component (a), of at most 1,000 parts by weight, preferably at most 500 parts by weight, most preferably at most 300 parts by weight, and at least 10 parts by weight, preferably at least 20 parts by weight, most preferably at least 40 parts by weight. If the amount is less than the lower limit, the effect of Component (g) is not observed, that is, softness is poor, which brings a higher load to a kneader in the preparation process, and cleavage of a molecule takes place due to larger heat by shear stress. If it exceeds the upper limit, a final product may be sticky and have poor mechanical properties.

Component (h): Peroxide-Decomposing Olefinic Resin, and/or Peroxide-Decomposing Olefinic Copolymer Rubber The peroxide-decomposing olefinic resin and/or peroxide decomposing olefinic copolymer rubber improve dispersion of rubber in the composition obtained, and appearance of the molded articles. In addition, they have an effect of adjusting hardness and shrinkage of the molded articles. This component is thermally decomposed when heat-treated in the presence of the peroxide to have a decreased molecular weight and an increased flowability in a molten state. The examples of such include isotactic polypropylene and copolymers of propylene with other alpha-olefins such as ethylene, 1-butene, 1-hexene, and 4-methyl-1-pentene.

A homo portion of component (h) preferably has such a degree of crystallization, which can be estimated from Tm and delta Hm determined by DSC, that Tm ranges from 150° C. to 167° C. and delta Hm ranges from 25 mJ/mg to 83 mJ/mg. If Tm or delta Hm is out of the above-mentioned range, the rubber elasticity of a resin composition obtained at 100° C. or higher is not improved.

The MFR (ASTM D-1238, condition L, 230° C.) of component (h) is preferably 0.1 to 50 g/10 min. and more preferably 0.5 to 20 g/10 min. If it is less than the aforesaid lower limit, moldablity or a resin composition obtained is worse. If it exceeds the aforesaid upper limit, the rubber elasticity of a resin composition obtained is worse.

Component (h) is blended in an amount, per 100 parts by weight of component (a), of at most 150 parts by weight, preferably at most 100 parts by weight, and more preferably at most 50 parts by weight. There is no particular lower limit for the amount, but a preferable lower limit is 1 part by weight and more preferable lower limit is 5 parts by weight. If it exceeds the upper limit, a resin composition obtained is hard to lack softness, so that a molded article does not have rubber like texture.

Component (i): Peroxide-Crosslinking Olefinic Resin and/or Peroxide-Crosslinking Olefinic Copolymer Rubber As Component (i) in the present invention, use can be made of one which primarily undergoes crosslinking reaction to have a lowered flowability when heat treated in the presence of a peroxide. Examples of such include polyethylenes having a polymer density ranging from 0.88 to 0.94 g/cm$^3$, e.g., high density polyethylene, low density polyethylene, linear low density polyethylene, and ultra low density polyethylene, and amorphous random copolymeric elastomers comprising primarily of an olefin, such as ethylene-propylene copolymer rubbers and ethylene-propylene-non-conjugated diene copolymer rubbers. Among these, polyethylenes and ethylene-propylene copolymer rubbers are desirable. In particular, linear low density polyethylene is particularly preferred because an appropriate crosslinked structure can be obtained.

When Component (i) is a rubber, a desirable Mooney viscosity, $ML_{1+4}$ (100° C.), of Component (i) ranges from 10 to 120, more preferably from 40 to 100. If the rubber has a Mooney viscosity below 10, a rubbery property of a resin composition obtained is worse. It the rubber has a Mooney viscosity above 120, moldability of a composition obtained is worse and, in particular, appearance of a molded article is worse.

An appropriate ethylene content in the copolymer ranges from 5 to 50 wt. %, preferably from 6 to 20 wt. %, and more preferably 10 to 15 wt. %. If the ethylene content is less than 5 wt. %, softness of a resin composition obtained is insufficient. If it exceeds 50 wt. %, mechanical strength of a molded article is low.

A weight average molecular weight of the peroxide-crosslinking olefinic resin and/or copolymer rubber containing the same ranges from 50,000 to 1,000,000, preferably from 70,000 to 500,000. It a peroxide-crosslinking olefinic resin and/or copolymer rubber containing the same has a weight average molecular weight of less than 50,000, a rubbery property of a resin composition obtained is worse. If one with a weight average molecular weight exceeding 1,000,000 is used, moldability is poor and, in particular, appearance of a molded article is worse.

Component (i) preferably has an MFR ranging from 0.1 to 50 g/10 min., more preferably from 0.5 to 30 g/10 min.

Component (i) is blended in an amount, per 100 parts by weight of component (a), of at most 150 parts by weight, preferably at most 100 parts by weight, more preferably at most 50 parts by weight, and most preferably at most 10 parts by weight. There is no particular lower limit for the amount, but preferably the lower limit is 1 part by weight and more preferably 3 parts by weight. If the amount exceeds the upper limit, a resin composition obtained is so hard to lose softness, so that a molded article does not have rubbery texture, and softness is worse.

When the above-mentioned Component (g) is blended in an amount of 450 parts by weight or more, components (h) and (i) may be omitted. That is, when component (g) is blended in an amount of less than 450 parts by weight, a flowing phase necessary for melt-kneading is not sufficiently formed, so that uniform kneading is impossible, and, therefore, the addition of components (h) and (i) are essential. On the other hand, when component (g) is blended in an amount of 450 parts by weight or more, a flowing phase necessary for melt-kneading is sufficiently formed, which allows uniform blending without components (h) and (i).

To the thermoplastic resin composition according to the present invention, anti-blocking agents, heat stabilizers, antioxidants, UV-ray absorbents, colorants, thickening agents, anti-aging agents, and fillers can be added in addition to the above-mentioned components.

The processes of preparing the present composition will be explained in detail below. Either of the two processes below can be used.

First Process

In a first step, components (a), (d), and (e), preferably components (b), (c), and (f), are blended together and then melt-kneaded in a kneader at a kneading temperature of 100° C. or lower to prepare a thermoplastic resin composition (I) (hereinafter referred to as "master batch (I)").

Subsequently, in a second step, component (j) or components (a), (g), (h) and (i) are added to master batch (I) obtained in the first step. Then, the mixture is melt-kneaded at a kneading temperature of 180 to 220° C. in a kneader to obtain an intended resin composition. If desired, the mixture is molded into molded articles, using an extruder or injection molding machine provided with a kneading function.

Second Process

In a first step, the composition (I) (master batch (I)) is obtained as in the first step of the first process. Separately, components (a), (g), (h) and (i) are blended together and then melt-kneaded at a kneading temperature of 160 to 220° C. in a kneader to obtain a composition (II) (master batch (II)). Subsequently, master batch (I) obtained in the first step and master batch (II) obtained in the separate step are blended together and melt-kneaded at a kneading temperature of 180 to 220° C. to obtain an intended resin composition. If desired, the mixture is molded into molded articles, using an extruder or injection molding machine provided with a kneading function.

In the present invention, any kneader such as a pressure kneader, a Banbury mixer, a single screw extruder, a twin-screw extruder, or a multi-screw extruder can be used. Preferably, a kneader for batch operation such as a pressure kneader and a Banbury mixer is used in the first step. To carry out the process continuously, it is desirable to use a combination of a kneader for batch operation and an extruder, for example, a pressure kneader combined with an extruder (i.e., batch-wise feeding type continuous extruder).

Various kinds of additives such as anti-blocking agents, heat stabilizers, antioxidants, UV-ray absorbents, colorants, thickening agents, anti-aging agents, and fillers can be added either in the first step or in the second step, but preferably, in the second process.

EXAMPLES

The present invention will be explained with reference to the following Examples and Comparative Examples, but not limited to those.

The methods used to evaluate a thermoplastic resin composition (I) is as follows:

(1) Kneading property

The components in predetermined amounts were placed in a 20-liter pressure kneader and kneaded for 6 minutes, and then the conditions of the obtained blend were observed with the eye.

⊚: The blend was in an extremely well dispersed state.

○: The blend was in a well dispersed state.

Δ: The blend was partially in dispersed state.

X: The blend was not in a dispersed state, with some agglomerates.

(2) Discharging property

In discharging the kneaded product from the 20-liter pressure kneader, it was observed with the eye whether the product could be discharged easily without adhering to the kneader or not.

⊚: Discharged easily.

○: Discharged.

Δ: Discharged with little difficulty.

X: Discharged with difficulty.

(3) Pelletizing property (granulation property)

The kneaded product was extruded from a dice of an 80 mm single screw extruder and cut into pellets with a rotary cutter. The pellets were evaluated for appearance, adhesion to the dice, and chained pellets.

⊚: Satisfactory pellets were produced.

○: Pellets were produced.

Δ: Pellets were scarcely produced.

X: Pellets could not be produced.

(4) Bleed-out (tackiness)

A 1 mm thick pressed sheet was formed from the composition by preheating the composition at 80° C. for 2 minutes and, then, pressurizing it at a pressure of 50 kgf/cm². The sheet prepared was allowed to stand at 50° C. for 10 minutes and the surface of the sheet was observed for any liquid substance bled out on the surface.

○: No bleed-out

Δ: Slight bleed-out.

X: Significant bleed-out.

The physical properties of the crosslinked compositions were evaluated in the following methods.

(5) Lump (crosslinked gel)

A composition was prepared in a single screw extruder, Labplast mill D20-22, ex Toyo Seiki Seisakusho, at a temperature of 160° C. to 200° C. and at a rotational speed of 30 rpm, and extruded from a 0.5 mm thick T die into a film, which was then visually observed. For an area of 10 cm² of the tape, the number of lumps with a size comparable to a foreign material of 0.3 mm² or greater, as specified by the Ministry of Finance, was counted.

⊚: No lump was found.

○: One lump was found.

Δ: Two to three lumps were found.

X: Four or more lumps were found.

(6) Specific gravity: measured according to JIS method A as described in JIS K7112. A test specimen was prepared by pressing the pellets obtained by melt-kneading into a 6.3 mm thick sheet at 240° C.

(7) Hardness: measured according to JIS method A as described in JIS K6253. A test specimen was prepared by pressing the pellets obtained by melt-kneading into a 6.3 mm thick sheet at 240° C.

(8) Tensile strength: measured according to JIS K6251. A test specimen was prepared by punching a 1 mm thick pressed sheet into a shape of dumbbell No. 3. A drawing speed was 500 mm/min.

(9) 100% elongation stress: measured according to JIS K 6251. A test specimen was prepared by punching a 1 mm thick pressed sheet into a shape of dumbbell No. 3. A drawing speed was 500 mm/min.

(10) Elongation at break: measured according to JIS K 6251. A test specimen was prepared by punching a 1 mm thick pressed sheet into a shape of dumbbell No. 3. A drawing speed was 500 mm/min.

(11) Compression set: measured according to JIS K 7181. As a test specimen, a 6.3 mm thick pressed sheet was used. The test specimen was compressed at 120° C. for 72 hours and at a 25% deformation.

(12) Oil resistance: measured according to JIS K 6251. A test specimen was prepared by punching a 1 mm thick pressed sheet into a shape of dumbbell No. 3. Using ASTM No. 2 oil (IRM #902), residual tensile strength and residual elongation after keeping the test specimen at 120° C. for 72 hours were measured. The drawing speed was 500 mm/min.

The following substances were used.

Component (a): Block Copolymer

Septon 4077 (tradename), ex Kuraray Co., Ltd.

Type: Styrene-ethylene/propylene-styrene copolymer (SEPS)

Styrene content: 30 wt. %

Isoprene content: 70 wt. %

Number average molecular weight: 260,000

Weight averaged molecular weight: 320,000

Molecular weight distribution; 1.23

Hydrogenation ratio: 90% or more

Component (b): Liquid Polybutadiene

R-45HT (trademark), ex Idemitsu Petrochemical Co., Ltd., having functional groups, i.e., of hydroxyl groups (allyl type, primary) and copolymerizable unsaturated double bonds (1,4-bonds: 80%).

Number average molecular weight: 2,800

Component (c): Saturated Hydrocarbon

IP-Solvent 2835 (tradename), ex Idemitsu Petrochemical Co., Ltd.

Type: Synthetic isoparaffin hydrocarbon comprising at least 99.8% wt isoparaffins Specific gravity: 0.82 (15° C.)

Pour point: −60° C.

Flash point: 139° C.

Ignition point: 200° C. or higher

Distillation range: 277 to 353° C.

Component (d): Organic Peroxide 2,5-dimethyl-2,5-di(t-butylperoxy)-hexane, Perhexa 25B (tradename), ex NOF Corp.

Component (e): One or more substances selected from the group consisting of multifunctional vinyl compounds and multifunctional (meth)acrylate compounds Triethylene glycol dimethacrylate, NK Ester 3G (tradename), ex shin-Nakamura Chemical Co., Ltd.

Component (f): Lubricant

Highwax 400P (tradename), ex Mitsui Chemicals, Inc.

Type: Polyethylene wax

Component (g); Softening Agent for Rubbers

Diana Process Oil PW-90 (tradename), ex Idemitsu Kosan Co., Ltd.

Weight average molecular weight: 540

Paraffinic carbon ratio: 71%

Naphthenic carbon ratio: 29%

Component (h): Propylene Homopolymer

PP CJ700 (trademark), ex Mitsui Chemicals, Inc.

Degree of crystallization: Tm 166° C., delta Hm 82 mJ/mg

Component (i): Polyethylene polymerized with a methalocene catalyst

SP2040 (trademark), ex Mitsui Chemicals, Inc. Type: LLDPE

MFR: 4 g/10 min. (Measurement load: 2160 g, Measurement temperature: 190° C.)

Filler: Calcium carbonate, RS400 (trademark), ex Sankyo Seifun Co., Ltd.

The following substances were used in the Comparative Examples.

Met-PE, ex Dow Chemical Japan Ltd., Engage EG8150 (trademark)

Type: Ethylene/octane copolymers

Density: 0.868 g/cm$^3$

MFR: 0.5 g/10 min (Measurement temperature: 190° C., measurement load: 2160 g)

Ethylene/ethylacrylate (EEA) copolymer: NUC6570 (tradename), ex Nippon Unicar Co., Ltd.

Ethylacrylate content: 25%

Softening point: 43° C. (Vicat method, ASTM D 1525)

Example 1

Figure 2:
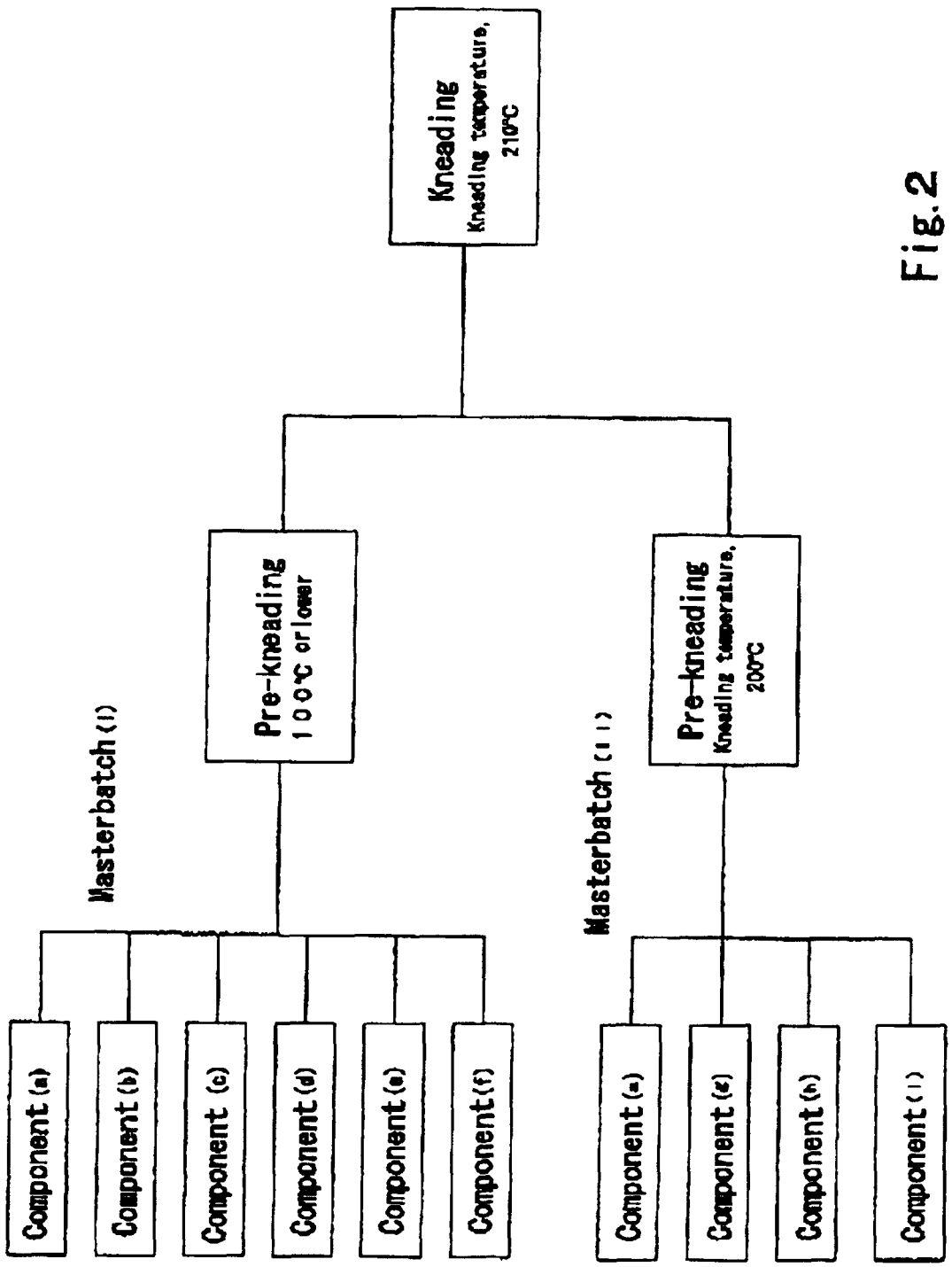
FIG. 2 is a flowchart of a second preparation method used in the Examples and the Comparative Examples.

Thermoplastic resin compositions were prepared according to the following Preparation Method 1 and Preparation Method 2 of which flowcharts are shown in FIGS. 1 and 2, respectively.

Preparation Method 1

In a first step, 100 parts by weight of SEPS 4077 as Component (a), 31 parts by weight of R-45HT as Component (b), 31 parts by weight of IP Solvent as Component (c), 32 parts by weight of Perhexa 25B as Component (d), 57 parts by weight of NK Ester 3G as Component (e), and 2.5 parts by weight of Highwax 400P as Component (f) were mixed. The mixture was fed in a 20-liter pressure kneader and kneaded for 6 minutes with heating by steam at a gauge pressure of 3.0 kg/cm$^2$ until the temperature rose to 80° C.

Subsequently, the kneaded product was pelletized at a kneading temperature of 50° C. and at a screw rotation speed of 80 rpm in a single screw extruder with L/D=20 equipped with a rotary cutter at the front end to prepare pellets of thermoplastic resin composition (I) (master batch (I)).

Then, in a second step, 22.5 parts by weight of thermoplastic resin composition (I) obtained in the first step was mixed with 100 parts by weight of SEPS 4077 as component (a), 175 parts by weight of PW-90 as component (g), 40 parts by weight of CJ700 as component (h), and 5 parts by weight of SP2040 as component (i). The mixture was placed in a twin-screw extruder with L/D=47 and melt kneaded at a temperature of 210° C. and at a screw rotation speed of 350 rpm to obtain an intended resin composition.

Preparation Method 2

As in the first step in Preparation Method 1, thermoplastic resin composition (I) (master batch (I)) was prepared.

Separately, 100 parts by weight of SEPS 4077 as component (a), 175 parts by weight of PW-90 as component (g), 40 parts by weight of CJ700 as component (h), and 5 parts by weight of SP2040 as component (i) were mixed. The mixture was then pelletized at a kneading temperature of 200° C. and at a screw rotation speed of 80 rpm in a single screw extruder with L/D=20 equipped with a rotary cutter at the front end to obtain master batch (II).

Subsequently, 22.5 parts by weight of master batch (I) obtained in the first step and the entire master batch (II) obtained in the separate step were fed in a twin-screw extruder with L/D=47 and melt kneaded at a kneading temperature of 210° C. and at a screw rotation speed of 350 rpm to prepare an intended resin composition.

From the resin compositions obtained by Preparation Methods 1 and 2, test specimens of 130 mm long×130 mm wide×2 mm thick were prepared by injection molding in the following conditions, and evaluated for physical properties.

Molding temperature: 220° C.

Mold temperature: 30° C.

Injection rate: 15 mm/sec

Injection pressure: 800 kg/cm$^2$

Dwelling pressure: 200 kg/cm$^2$

Injection time: 5 seconds

Cooling time: 20 seconds

Examples 2 to 10 and Comparative Examples 1 to 5

Those were carried out in the same manner as in Example 1.

The results are as shown in Tables 1 through 3. Table 1 and Table 2 respectively show the compositions and evaluation results of the thermoplastic resin compositions (I) obtained in the first step (master batch (I)) in Preparation Examples 1 to 11 and in Comparative Preparation Examples 1 to 11. Table 3 shows the compositions and the evaluation results of the final products, thermoplastic resin compositions. It should be noted that all of the compositions of the Examples and Comparative Examples were prepared in duplicate by both of the Preparation Methods 1 and 2. The properties of the resin compositions obtained by Preparation Method 1 and those by Preparation Method 2 were found to agree to each other within an error range of 5%.

TABLE 1

Preparation Examples of Thermoplastic Resin Composition (I)

| | Preparation Examples | 1 | 2 | 3 | 4 | 5 | 6 | 7 | 8 | 9 | 10 | 11 |
|---|---|---|---|---|---|---|---|---|---|---|---|---|
| Component (a) | SEPS 4077 | 100 | 100 | 100 | 100 | 100 | 100 | 100 | 100 | 100 | 100 | 100 |
| Component (b) | Liquid polybutadiene | 31 | 15 | 45 | 31 | 31 | 31 | 31 | 31 | 31 | 31 | 31 |
| Component (c) | IP Solvent | 31 | 31 | 31 | 15 | 45 | 31 | 31 | 31 | 31 | 31 | 31 |
| Component (d) | Organic peroxide | 32 | 32 | 32 | 32 | 32 | 5 | 50 | 32 | 32 | 32 | 32 |
| Component (e) | Crosslinking aid | 57 | 57 | 57 | 57 | 57 | 57 | 57 | 10 | 80 | 57 | 57 |
| Component (f) | Lubricant | 25 | 25 | 25 | 25 | 25 | 25 | 25 | 25 | 25 | 2 | 5 |
| | Kneading property | ◎ | ◎ | ○ | ◎ | ○ | ◎ | ○ | ◎ | ○ | ◎ | ◎ |
| | Discharging property | ○ | ○ | ○ | ○ | ○ | ○ | ○ | ○ | ○ | ○ | ◎ |
| | Pelletizing property | ○ | ○ | ○ | ○ | ○ | ○ | ○ | ○ | ○ | ○ | ○ |
| | Bleed-out (tackiness of molded article) | ○ | ○ | Δ | ○ | ○ | ○ | Δ | ○ | Δ | ○ | ○ |

TABLE 2

Comparative Preparation Examples of Thermoplastic Resin Composition (I)

| | Comparative Preparation Examples | 1 | 2 | 3 | 4 | 5 | 6 | 7 | 8 | 9 | 10 | 11 |
|---|---|---|---|---|---|---|---|---|---|---|---|---|
| Component (a) | SEPS 4077 | 100 | 100 | 100 | 100 | 100 | 100 | 100 | 100 | 100 | 100 | 100 |
| Component (b) | Liquid polybutadiene | 10 | 50 | 31 | 31 | 31 | 31 | 31 | 31 | 31 | 31 | 0 |
| Component (c) | IP Solvent | 31 | 31 | 10 | 50 | 31 | 31 | 31 | 31 | 31 | 31 | 0 |
| Component (d) | Organic peroxide | 32 | 32 | 32 | 32 | 2 | 60 | 32 | 32 | 32 | 32 | 32 |
| Component (e) | Crosslinking aid | 57 | 57 | 57 | 57 | 57 | 57 | 5 | 100 | 57 | 57 | 57 |
| Component (f) | Lubricant | 25 | 25 | 25 | 25 | 25 | 25 | 25 | 25 | 0 | 10 | 25 |
| | MePE | | | | | | | | | | | 80 |
| | EEA | | | | | | | | | | | 80 |
| | Kneading property | ○ | X | ○ | X | ○ | X | ○ | X | ○ | ○ | ○ |
| | Discharging property | ○ | X | ○ | X | ○ | X | ○ | X | X | ◎ | ○ |
| | Pelletizing property | X | X | X | X | ○ | X | ○ | X | ○ | ○ | ○ |
| | Bleed-out (Tackiness of molded article) | ○ | — | ○ | — | ○ | — | ○ | — | ○ | ○ | ○ |

TABLE 3

Composition of Thermoplastic Resin Composition and Evaluation Results

| Component | | | Example 1 | Example 2 | Example 3 | Example 4 | Example 5 |
|---|---|---|---|---|---|---|---|
| a | SEPS 4077 | | 100 | 100 | 100 | 100 | 100 |
| g | Softening agents for rubber | | 175 | 350 | 175 | 175 | 175 |
| h | PP | | 40 | 6.25 | 40 | 40 | 40 |
| i | PE | | 5 | 5 | 5 | 5 | 5 |
| | Thermoplastic Resin Composition (1) | Prep. Ex. 1[*1] | 22.5 | 22.5 | 22.5 | | |
| | | Prep. Ex. 2 | | | | | |
| | | Prep. Ex. 4 | | | | 22.5 | |
| | | Prep. Ex. 6 | | | | | |
| | | Prep. Ex. 8 | | | | | |
| | | Prep. Ex. 10 | | | | | |
| | | Prep. Ex. 11 | | | | | 22.5 |
| | | Comp. Prep. Ex. 5[*2] | | | | | |
| | | Comp. Prep. Ex. 7 | | | | | |
| | | Comp. Prep. Ex. 10 | | | | | |
| | | Comp. Prep. Ex. 11 | | | | | |

TABLE 3-continued

Composition of Thermoplastic Resin Composition and Evaluation Results

| | | | | | | |
|---|---|---|---|---|---|---|
| Filler | | 20 | 20 | 0 | 20 | 20 |
| Specific Gravity | — | 0.93 | 0.92 | 0.9 | 0.93 | 0.93 |
| Hardness (HDA 15 sec) | — | 63 | 5 | 63 | 65 | 64 |
| Tensile strength | MPa | 11 | 2.2 | 11 | 11 | 12 |
| 100% Stress | MPa | 2.1 | 0.3 | 2.1 | 2.5 | 2.4 |
| Elongation at break | % | 800 | 800 | 800 | 790 | 780 |
| Compression permanet set (120° C. × 72 hrs) | % | 63 | 56 | 63 | 62 | 64 |
| Oil resistance | % | 73 | 260 | 73 | 71 | 74 |
| Bleed-out (tackiness of molded article) | — | ○ | ○ | ○ | ○ | ○ |
| Lumps (crosslinked gel) | — | ○ | ○ | ○ | ○ | ○ |

| Component | | | Example 6 | Example 7 | Example 8 | Example 9 | Example 10 |
|---|---|---|---|---|---|---|---|
| a | SEPS 4077 | | 100 | 100 | 100 | 100 | 100 |
| g | Softening agents for rubber | | 175 | 175 | 175 | 175 | 1000 |
| h | PP | | 40 | 40 | 40 | 40 | 0 |
| i | PE | | 5 | 5 | 5 | 5 | 0 |
| | Thermoplastic Resin Composition (I) | Prep. Ex. 1 | | | | | 22.5 |
| | | Prep. Ex. 2 | | | | | |
| | | Prep. Ex. 4 | | | | | |
| | | Prep. Ex. 6 | 22.5 | | | | |
| | | Prep. Ex. 8 | | 22.5 | | | |
| | | Prep. Ex. 10 | | | 22.5 | | |
| | | Prep. Ex. 11 | | | | 22.5 | |
| | | Comp. Prep. Ex. 5 | | | | | |
| | | Comp. Prep. Ex. 7 | | | | | |
| | | Comp. Prep. Ex. 10 | | | | | |
| | | Comp. Prep. Ex. 11 | | | | | |
| | Filler | | 20 | 20 | 20 | 20 | 20 |
| | Specific Gravity | — | 0.93 | 0.93 | 0.93 | 0.93 | 0.88 |
| | Hardness (HDA 15 sec) | — | 63 | 63 | 63 | 63 | 0 |
| | Tensile strength | MPa | 10 | 10 | 11 | 11 | 0.5 |
| | 100% Stress | MPa | 2.1 | 2.1 | 2.1 | 2.1 | 0.1 |
| | Elongation at break | % | 820 | 830 | 800 | 800 | 300 |
| | Compression permanet set (120° C. × 72 hrs) | % | 65 | 66 | 63 | 63 | 60 |
| | Oil resistance | % | 77 | 76 | 73 | 73 | 350 |
| | Bleed-out (tackiness of molded article) | — | ○ | ○ | ○ | ○ | Δ |
| | Lumps (crosslinked gel) | — | ○ | ○ | ○ | ○ | ○ |

| Component | | | Comparative Example 1 | Comparative Example 2 | Comparative Example 3 | Comparative Example 4 | Comparative Example 5 |
|---|---|---|---|---|---|---|---|
| a | SEPS 4077 | | 100 | 100 | 100 | 100 | 100 |
| g | Softening agents for rubber | | 175 | 350 | 175 | 175 | 175 |
| h | PP | | 40 | 6.25 | 40 | 40 | 40 |
| i | PE | | 5 | 5 | 5 | 5 | 5 |
| | Thermoplastic Resin Composition (I) | Prep. Ex. 1 | | | | | |
| | | Prep. Ex. 2 | | | | | |
| | | Prep. Ex. 4 | | | | | |
| | | Prep. Ex. 6 | | | | | |
| | | Prep. Ex. 8 | | | | | |
| | | Prep. Ex. 10 | | | | | |
| | | Prep. Ex. 11 | | | | | |
| | | Comp. Prep. Ex. 5 | | | 22.5 | | |
| | | Comp. Prep. Ex. 7 | | | | 22.5 | |
| | | Comp. Prep. Ex. 10 | | | | | 22.5 |
| | | Comp. Prep. Ex. 11 | 22.5 | 22.5 | | | |
| | Filler | | 20 | 20 | 20 | 20 | 20 |
| | Specific Gravity | — | 0.93 | 0.91 | 0.93 | 0.93 | 0.93 |
| | Hardness (HDA 15 sec) | — | 62 | 7 | 60 | 61 | 60 |
| | Tensile strength | MPa | 9 | 1.7 | 1 | 15 | 14 |
| | 100% Stress | MPa | 2.1 | 0.2 | 2 | 2.1 | 2 |
| | Elongation at break | % | 750 | 750 | 800 | 800 | 800 |
| | Compression permanet set (120° C. × 72 hrs) | % | 63 | 89 | 78 | 75 | 76 |
| | Oil resistance | % | 90 | 300 | 88 | 95 | 97 |

TABLE 3-continued

Composition of Thermoplastic Resin Composition and Evaluation Results

| | | | | | | |
|---|---|---|---|---|---|---|
| Bleed-out (tackiness of molded article) | — | ○ | ○ | ○ | ○ | ○ |
| Lumps (crosslinked gel) | — | X | X | ○ | ○ | ○ |

Note
*[1]Prep. Ex.: Preparation example
*[2]Comp. Prep. Ex.: Comparative preparation example As seen from Table 3, the thermoplastic resin compositions of the present invention had no lump and were superior in properties such as compression set and/or oil resistance. In contrast, the thermoplastic resin compositions in Comparative Examples 1 and 2 had lumps, where the compositions were made from the thermoplastic resin composition (I) (a master batch (I)) obtained in Comparative Preparation Example 11 without component (c). This is probably because the crosslinking reaction occurred too rapidly due to the absence of component (c). The resin compositions in Comparative Examples 3 to 5 prepared using the thermoplastic resin composition (I) (a master batch (I)) obtained in Comparative Preparation Examples 5, 7 and 10, were found to be inferior in properties such as compression set and oil resistance, though they had no lumps.

INDUSTRIAL APPLICABILITY

The present invention provides a master batch of an organic peroxide in which the organic peroxide is uniformly dispersed in a thermoplastic resin, so that crosslinking or decomposition reaction takes place uniformly, and a preparation method thereof, a thermoplastic resin composition prepared using the master batch and a preparation method thereof. The present invention makes it easier to control a crosslinking and/or decomposition rate and to prepare a thermoplastic resin composition which has no lumps when molded into articles, and has excellent handling properties, and physical properties.

What is claimed is:

1. A thermoplastic resin composition comprising
   (a) 100 parts by weight of a block copolymer comprising at least two polymeric blocks A composed mainly of a vinyl aromatic compound and at least one polymeric block B composed mainly of a conjugated diene compound, or a hydrogenated block copolymer thereof,
   (d) 5 to 50 parts by weight of an organic peroxide, and
   (e) 10 to 80 parts by weight of one or more substances selected from the group consisting of multifunctional vinyl compounds and multifunctional (meth)acrylate compounds.

2. The thermoplastic resin composition according to claim 1, wherein the composition further comprises
   (b) 15 to 45 parts by weight of a liquid polybutadiene, or
   (c) 15 to 45 parts by weight of a branched saturated hydrocarbon having 4 to 155 carbon atoms, or both (b) and (c), and
   (f) 0 to 5 parts by weight of a lubricant.

3. The thermoplastic resin composition according to claim 2, wherein component (c) is a branched saturated hydrocarbon having 4 to 20 carbon atoms.

4. The thermoplastic resin composition according to claim 2, wherein the branched saturated hydrocarbon is one or more co-oligomers selected from the group consisting of isopropyl-ethylene co-oligomers, isopropyl-propylene co-oligomers, isopropyl-butene co-oligomers, and isopropyl-octane co-oligomers, each co-oligomers having a weight average molecular weight of 260 to 2,000.

5. The thermoplastic resin composition according to claim 2, wherein the branched saturated hydrocarbon is an isoparaffin.

6. The thermoplastic resin composition according to claim 5, wherein the isoparaffin is liquid at room temperature.

7. The thermoplastic resin composition according to claim 5, wherein the isoparaffin has an ignition point of 200° C. or higher.

8. A thermoplastic resin composition comprising 3 to 50 parts by weight of the thermoplastic resin composition according to any one of claims 1 to 7, and
   (j) 100 parts by weight of one or more thermoplastic resins selected from the group consisting of styrene-butadiene-styrene copolymers, styrene-isoprene-styrene copolymers, styrene-(ethylene/butene)-styrene copolymers, styrene-(ethylene/propylene)-styrene copolymers, styrene-(ethylene/ethylene/propylene)-styrene copolymers, styrene-butadiene rubbers, butadiene rubbers, polybutadienes, isoprene rubbers, acrylonitrile-butadiene rubbers, chloroprene rubbers, ethylene-propylene rubbers, ethylene-propylene-diene terpolymers, butyl rubbers, acrylic rubbers, polyolefin resins, thermoplastic polyester elastomers, thermoplastic polyurethane elastomers and thermoplastic amide elastomers.

9. A thermoplastic resin composition comprising 3 to 50 parts by weight of the thermoplastic resin composition according to any one of claims 1 to 7, and
   (a) 100 parts by weight of a block copolymer comprising at least two polymeric blocks A composed mainly of a vinyl aromatic compound and at least one polymeric block B composed mainly of a conjugated diene compound, or a hydrogenated block copolymer thereof,
   (g) 10 to 1,000 parts by weight of a non-aromatic softening agent for rubbers,
   (h) 0 to 150 parts by weight of a peroxide-decomposing olefin resin, or a peroxide-decomposing olefinic copolymer rubber, and
   (i) 0 to 150 parts by weight of a peroxide-crosslinking olefin resin, or a peroxide-crosslinking olefinic copolymer rubber.

10. A method of preparing the thermoplastic resin compositions according to claim 1 comprising a step of kneading the components at a temperature of 100° C. or lower.

11. A method of preparing a thermoplastic resin composition comprising
   a first step for preparing thermoplastic resin composition (I) according to claim 1 by kneading the components at a temperature of 100° C. or lower; and a second step of melt-kneading 3 to 50 parts by weight of said thermoplastic resin composition (I) with
  (j) 100 parts by weight of one or more thermoplastic resins selected from the group consisting of styrene-butadiene-styrene copolymers, styrene-isoprene-styrene copolymers, styrene-(ethylene/butene)-styrene copolymers, styrene-(ethylene/propylene)-styrene copolymers, styrene-(ethylene/ethylene/propylene)-styrene copolymers, styrene-butadiene rubbers, butadiene rubbers, polybutadienes, isoprene rubbers, acrylonitrile-butadiene rubbers, chloroprene rubbers, ethylene-propylene rubbers, ethylene-propylene-diene terpolymers, butyl rubbers, acrylic rubbers, polyolefin resins, thermoplastic polyester elastomers, thermoplastic polyurethane elastomers and thermoplastic amide elastomers.

12. A method of preparing a thermoplastic resin composition comprising
  a first step for preparing thermoplastic resin composition (I) according to claim 1 by kneading the components at a temperature of 100° C. or lower; and
  a second step of melt kneading 3 to 50 parts by weight of said thermoplastic resin composition (I) with
  (a) 100 parts by weight of a block copolymer comprising at least two polymeric blocks A composed mainly of a vinyl aromatic compound and at least one polymeric block B composed mainly of a conjugated diene compound, or a hydrogenated block copolymer thereof,
  (g) 10 to 1,000 parts by weight of a non-aromatic softening agent for rubbers,
  (h) 0 to 150 parts by weight of a peroxide-decomposing olefinic resin, or a peroxide-decomposing olefinic copolymer rubber, and
  (i) 0 to 150 parts by weight of a peroxide-crosslinking olefinic resin, or a peroxide-crosslinking olefinic copolymer rubber.

13. A thermoplastic resin composition prepared by the method according to any one of claims 10 to 12.

* * * * *